(12) United States Patent
Petrucelli

(10) Patent No.: US 7,126,065 B2
(45) Date of Patent: Oct. 24, 2006

(54) WEIGHING SCALE ADAPTED FOR ALLOWING A USER TO FIND AN OPTICAL WEIGHING POSITION ON THE SCALE

(75) Inventor: Steven Petrucelli, Cranbury, NJ (US)

(73) Assignee: Measurement Limited

(*) Notice: Subject to any disclaimer, the term of this patent is extended or adjusted under 35 U.S.C. 154(b) by 118 days.

(21) Appl. No.: 10/714,443

(22) Filed: Nov. 14, 2003

(65) Prior Publication Data

US 2004/0168836 A1  Sep. 2, 2004

Related U.S. Application Data

(60) Provisional application No. 60/426,142, filed on Nov. 14, 2002.

(51) Int. Cl.
  *G01G 19/00* (2006.01)
  *G01G 23/18* (2006.01)
(52) U.S. Cl. .................. 177/25.13; 177/177; 177/200; 702/174
(58) Field of Classification Search .. 177/25.11–25.17, 177/50, 177, 199, 200; 702/174
  See application file for complete search history.

(56) References Cited

U.S. PATENT DOCUMENTS

| 4,121,049 | A |  | 10/1978 | Roeber ...................... 178/18.1 |
|---|---|---|---|---|
| 4,558,757 | A |  | 12/1985 | Mori et al. ................. 178/18.5 |
| 4,848,477 | A | * | 7/1989 | Oldendorf et al. ........ 177/25.14 |
| 4,852,674 | A | * | 8/1989 | Gudat ......................... 177/141 |
| 5,143,164 | A | * | 9/1992 | Nahar ........................... 177/50 |
| 5,167,289 | A | * | 12/1992 | Stevenson .................... 177/141 |
| 5,521,827 | A |  | 5/1996 | Lindberg et al. ............ 701/124 |
| 5,750,937 | A | * | 5/1998 | Johnson et al. .......... 177/25.11 |
| 5,886,302 | A |  | 3/1999 | Germanton et al. ........ 177/199 |
| 5,929,391 | A |  | 7/1999 | Petrucelli et al. ........... 177/211 |
| 6,363,331 | B1 |  | 3/2002 | Kyrtsos ....................... 702/175 |
| 6,417,466 | B1 |  | 7/2002 | Gross et al. ................. 177/211 |
| 2004/0079557 | A1 | * | 4/2004 | Saxon et al. |

* cited by examiner

*Primary Examiner*—Randy W. Gibson
(74) *Attorney, Agent, or Firm*—Plevy, Howard & Darcy PC

(57) ABSTRACT

A weighing scale having a display and processor for determining and identifying the optimal position coordinates for a load placed on the weighing scale includes a platform and a plurality of support assemblies, each containing a load cell for receiving the weight of the load. The display includes a meter or other graphical display that identifies position coordinates along with the determined numerical weight. Individual outputs from each of the plurality (e.g. 4) of load cells are received by a processor configured to compute x,y vector coordinates associated with the weight parameters for each load cell. The determined current or actual load position relative to an optimal position is calculated and displayed along with the weight.

26 Claims, 8 Drawing Sheets

WEIGHING SCALE ADAPTED FOR ALLOWING A USER TO FIND AN OPTICAL WEIGHING POSITION ON THE SCALE

This application claims the benefit under 35 USC 119(e) of U.S. Provisional Patent Application Ser. No. 60/426,142, filed Nov. 14, 2002, the entirety of which is hereby incorporated by reference.

FIELD OF INVENTION

The present invention relates to weight measurement devices. More particularly, the present invention relates to a weighing scale having a processor that is programmed to determine the position of a load being weighed thereon and a display for graphically indicating the load's position relative to an optimal weighing position, so that the load can be repositioned to the optimal weighing position.

BACKGROUND OF THE INVENTION

There are many different types of electronic weighing scales in use today. One popular type of electronic weighing scale is constructed with a platform for receiving the load to be weighed and a set of levers, pivots, flexures, and torque tubes to mechanically combine the forces applied to the platform by the load, thereby enabling the measurement of these forces with a single electronic load cell, which operates as a force transducer. The load cell is typically constructed with a mechanically-deformable sensor plate with one or more sensor elements bonded thereto. When a load is applied to the load cell, the sensor plate mechanically bends and the sensor elements bonded thereto produce an electrical output signal, the magnitude of which is commensurate with the load applied to the load cell.

Another popular type of electronic weighing scale is constructed with a platform for receiving the load to be weighed, and a plurality of electronic load cells disposed at the corners of the platform, or more or less evenly spaced along the periphery or marginal periphery of the platform, for supporting the platform. Each of the load cells produces an electrical output signal indicative of the load sensed thereby. The electrical output signals of the load cells are averaged by processing circuitry associated with the scale to enable the load to be measured over a large area of the platform.

One problem associated with the multi-load cell scale described immediately above is that when the load is unevenly positioned on the platform, the load or force sensed by each of the load cells is not the same, with a disproportionate amount of the load or force being sensed by certain ones of the load cells. Consequently, the associated processing circuitry arrives at a weight calculation that is offset from the load's "true weight" determined when the load is centrally or optimally positioned on the scale.

Accordingly, a weighing scale is needed, which is capable of determining the position of a load being weighed thereon, and displaying the load's position relative to an optimal weighing position, so that the load can be repositioned to the optimal weighing position.

SUMMARY OF THE INVENTION

A weighing scale having a display and processor for determining and identifying the optimal position coordinates for a load placed on the weighing scale comprises a platform and a plurality of support assemblies, each containing a load cell for receiving the weight of the load. The display includes a meter or other graphical display that identifies position coordinates along with the determined numerical weight. Individual outputs from each of the plurality (e.g. 4) of load cells are received by a processor configured to compute x,y vector coordinates associated with the weight parameters for each load cell. The determined current or actual load position relative to an optimal position is calculated and displayed along with the weight.

DETAILED DESCRIPTION OF THE INVENTION

Figure 1:
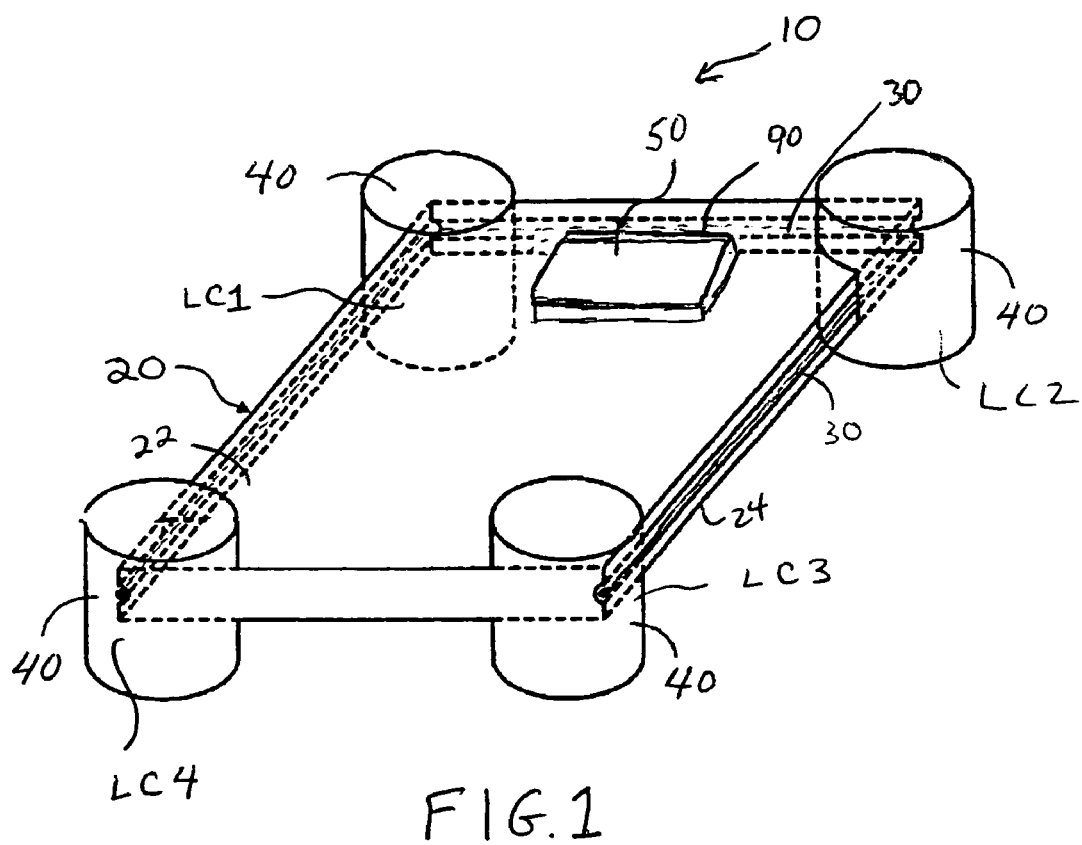
FIG. 1 is a perspective view of an exemplary embodiment of a weighing scale according to the present invention.

FIG. 1 shows an exemplary embodiment of a weighing scale 10 according to the present invention. The scale 10 comprises a base or platform 20 having a top surface 22 and a bottom surface 24. A plurality of supports 40 are provided for supporting the platform 20.

The supports 40 are attached to the platform 20 in a symmetrical or evenly-spaced arrangement so as to support the platform 20 above a ground, floor, table, or like surface in a stable and safe manner. In the shown embodiment, the platform 20 has a square or rectangular configuration with four supports 40 attached to the corners thereof. Although not shown, platforms having circular, elliptical, oval, triangular, octagonal, etc. configurations are also contemplated.

Each of the above mentioned supports 40 has integrated therein a load cell LC1–LC4, which is positioned such that it can sense a portion of a load (e.g. a person, animal or other object or article to be weighed) positioned on the platform 20 to be weighed. The load cells LC1–LC4 are typically located below the bottom surface 24 of the platform 20. Each of the load cells LC1–LC4 outputs an electrical signal in response to a portion of the load placed on the top surface 22 of the platform 20. Electrical conductors 30 or other means electrically connect each of the load cells LC1–LC4 to a processor 90, which electrically communicates with a display assembly 50 (the processor 90 may be contained within the display assembly 50 as shown in this embodiment) attached to, or integrated with the top surface of the platform 20. For additional information regarding the operation of the load cells and weighing scales employing load cells for weighing purposes, reference can be made to commonly assigned U.S. Pat. No. 5,929,391 entitled "Load Cell for an Electrical Weighing Scale", U.S. Pat. No. 6,417,466 entitled "Load cell with Bossed Sensor Plate for an Electrical Weighing Scale", and U.S. Pat. No. 5,886,302 entitled "Electrical Weighing Scale".

Figure 2:
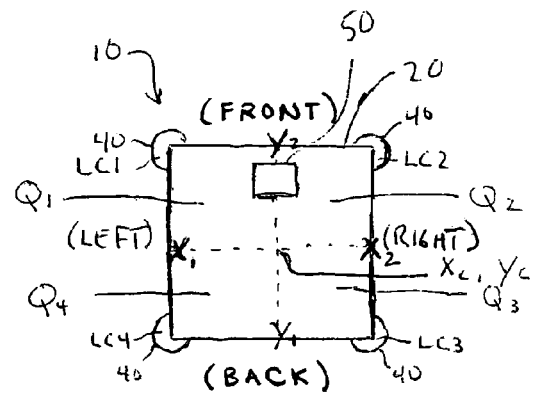
FIG. 2 is a plan view of the weighing scale platform.

As shown in FIG. 2, the platform 20 of the scale 10 is arranged in symmetrical quadrants Q1, Q2, Q3, and Q4 (shown with broken lines). Quadrant Q1 represents the top left quadrant of the platform 20, which is supported by load cell LC1; quadrant Q2 represents the top right quadrant of the platform 20, which is supported by load cell LC2; quadrant Q3 represents the bottom right quadrant of the platform 20, which is supported by load cell LC3; and quadrant Q4 represents the bottom left quadrant of the platform 20, which is supported by load cell LC4.

Figure 3:
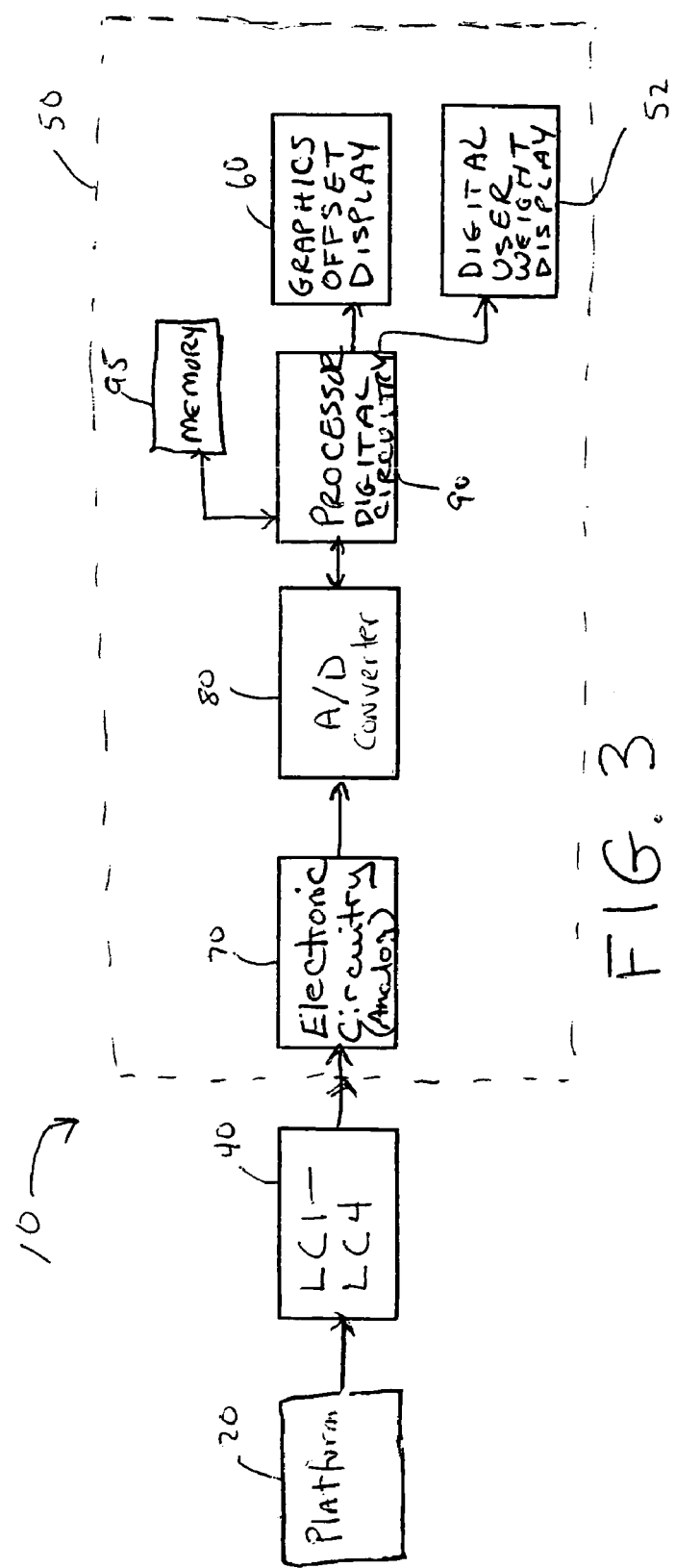
FIG. 3 is a block diagram depicting the major functional components of the weighing scale of the present invention.

FIG. 3 is a block diagram depicting the major functional components of the scale 10. As shown, the scale includes the components earlier described platform 20, platform supports 40 with LC1–LC4, and display assembly 50 containing the processor 90. The scale 10 also includes analog electronic circuitry (e.g. for resistance calibration) 70, an analog-to-digital converter 80, a memory 95 for storing data processed by the processor 90, a digital weight display 52, and a graphics position offset display 60, all of which may be contained in the display assembly 50.

Figure 4:
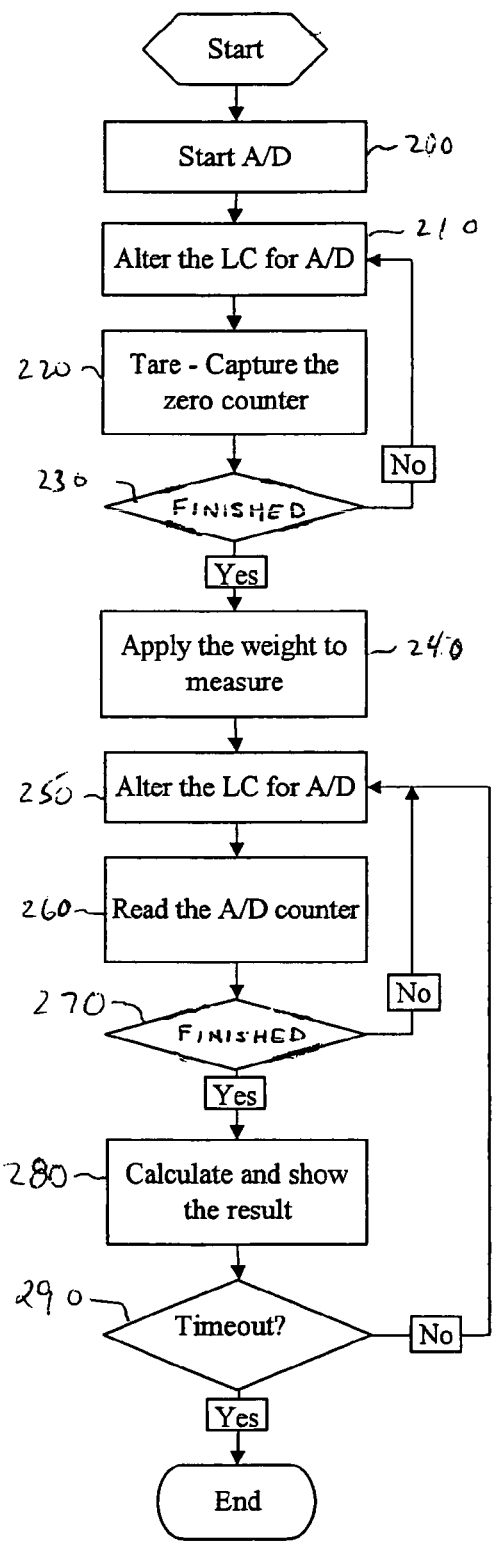
FIG. 4 is a flow chart depicting the operation of the weighing scale according to an exemplary embodiment of the present invention.

FIG. 4 is a flow chart depicting the operation of the scale 10. The scale 10 may operate in a tare mode, the steps of which are represented by blocks 200–230, and a weight measuring and optimal positioning mode, the steps of which are represented by blocks 240–290. The tare mode is performed before a load to be weighed, is placed on the scale 10, and commences in block 200 with an analog-to-digital conversion process, wherein the analog signal output of a selected one of the load cells LC1–LC4 is converted by the A/D converter in block 210 to a digital signal. In blocks 220, the processor uses the digital signal to tare the selected load cell. In block 230, the processor determines whether all the load cells LC1–LC4 have been tared. If the answer is no, the steps of blocks 210 through 230 are repeated.

If the answer in block 230 is yes, the weight measurement and optimal positioning mode may be commenced in block 240 with the placement of the load to be weighed onto the top surface of the scale platform in a predetermined position corresponding to x and y load position coordinates. The resulting analog signal output of a selected one of the load cells LC1–LC4 is converted in block 250 to a digital signal by the A/D converter. In block 260, the processor reads an A/D counter and in block 270 determines whether the analog signal outputs of all the load cells LC1–LC4 have been converted to digital signals. If the answer is no, the steps of blocks 250 through 270 are repeated. If the answer is yes, the actual position of the load on the platform, and how the actual position of the load on the platform deviates from the optimal position are calculated by the processor (using the digital information obtained in blocks 250 and 260) in block 280. The actual position of the load (and the weight of the load) may be communicated to the display assembly at this stage of the optimal positioning mode also. The optimal positioning process may end here or as depicted in block 290, a determination may be made as to whether a predetermined time period has run out. If the predetermined time period has run out (timeout), the optimal positioning mode ends (even if the optimal position has not been achieved) and the scale reverts to a conventional weighing mode. If the predetermined time period has not run out, steps 250–290 are repeated (the scale stays in the optimal positioning mode), thus allowing relocation of the load to the optimal position.

Figure 5A:
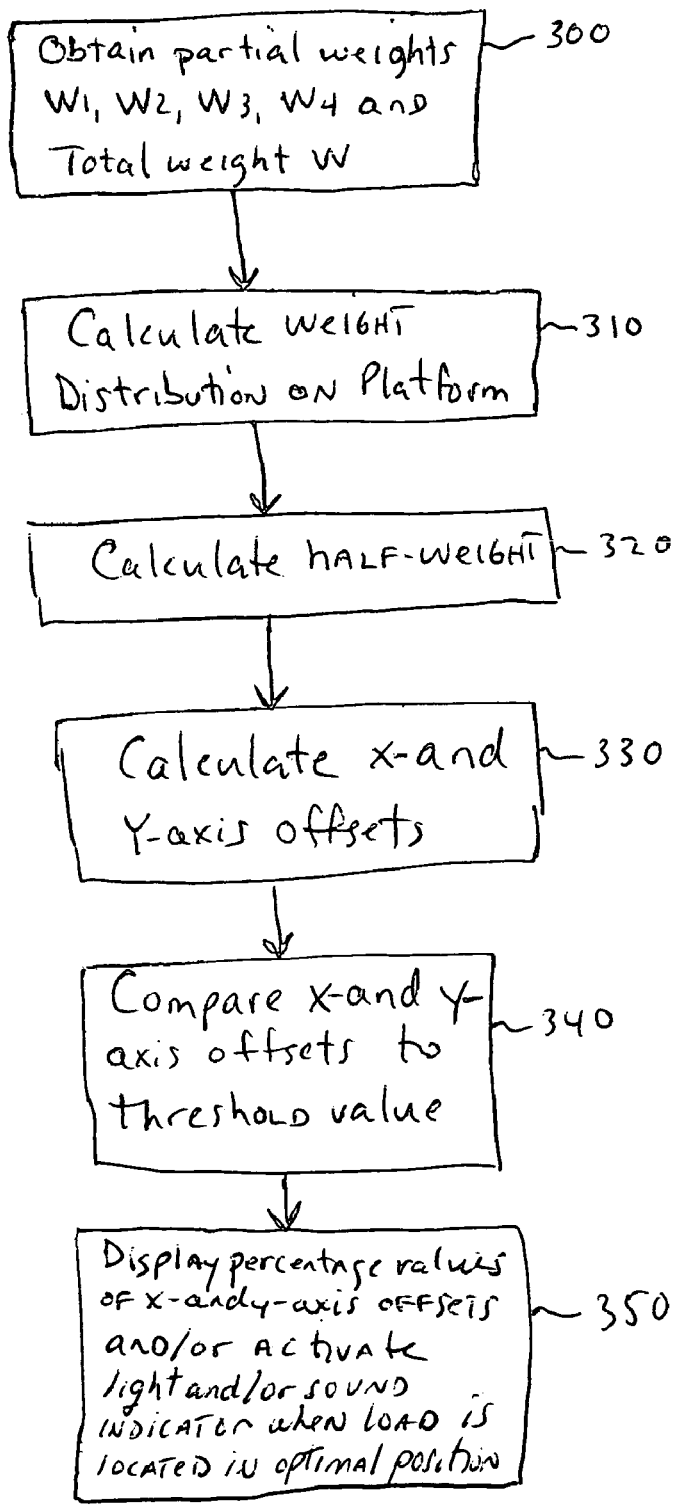
FIG. 5A is block diagram depicting an embodiment of a method for calculating the weight of the load, the actual position of the load on the platform, and how the actual position of the load on the platform deviates from the optimal position, according to the present invention.

FIG. 5A is a block diagram depicting an embodiment of a method for calculating the weight of the load, the actual position of the load on the platform, and how the actual position of the load on the platform deviates from the optimal position (block 280 of FIG. 4), according to the present invention. In block 300, partial weight W1 applied to platform quadrant Q1 is obtained from LC1 A/D; partial weight W2 applied to platform quadrant Q2 is obtained from LC2 A/D; partial weight W3 applied to platform quadrant Q3 is obtained from LC3 A/D; partial weight W4 applied to platform quadrant Q4 is obtained from LC4 A/D; and total weight W is obtained by summing the partial weights W1, W2, W3, W4 obtained from LC1 A/D, LC2 A/D, LC3 A/D, and LC4 A/D. If the load is optimally positioned on the platform of the scale (e.g. typically at the very center $X_c$, $Y_c$ of the platform 20 shown in FIG. 2), then the partial weights will be equal to one another (W1=W2=W3=W4), and the total weight will equal the sum of the partial weights (W=W1+W2+W3+W4).

In block 310, the portion of the load's weight distributed on the left side of the scale (quadrants Q1 and Q4 associated with axis segment $x_1$-$x_c$ shown in FIG. 2), the right side of the scale (quadrants Q2 and Q3 associated with axis segment $X_2$-$x_c$ shown in FIG. 2), the top side of the scale (quadrants Q1 and Q2 associated with axis segment $y_2$-$y_c$ shown in FIG. 2), and the bottom side of the scale (quadrants Q4 and Q3 associated with axis segment $y_1$-$y_c$ shown in FIG. 2), is calculated. The portion of the load's weight distributed on left side of the scale is calculated by summing partial weight W1 and partial weight W4; the portion of the load's weight distributed on right side of the scale is calculate by summing partial weight W2 and partial weight W3; the portion of the load's weight distributed on top side of the scale is calculated by summing partial weight W1 and partial weight W2; and the portion of the load's weight distributed on bottom side of the scale is calculated by summing partial weight W4 and partial weight W3. The above calculations are carried out by the processor 90 and stored in the memory 95.

In block 320, the half weight of the load is calculated by summing the partial weights W1, W2, W3, and W4 and dividing this sum by two (2). The above calculations are carried out by the processor 90 and stored in the memory 95.

In block 330, x-axis and y-axis load position offsets are calculated wherein the x-axis offset is the distance the weight of the load is offset, either left or right, from the center position $x_c$ of the $x_1$-$x_2$ axis of the platform (FIG. 2) and the y-axis offset is the distance the weight of the load is offset, either top or bottom, from the center position $y_c$ of the $y_2$-$y_1$ axis of the platform (FIG. 2). The x-axis offset may be calculated by dividing either the sum of the partial weights W1 and W4 for the left side of the scale, or the sum of the partial weights W2 and W3 for the right side of the scale, by the half weight. The y-axis offset may be calculated by dividing either the sum of the partial weights W1 and W2 for the top side of the scale, or the sum of the partial weight W4 and W3 for the bottom side of the scale, by the half weight. Each of these calculations is carried by the processor 90 and the result stored in the memory 95.

In block 330, x-axis and y-axis load position offsets are calculated wherein the x-axis offset is the distance the weight of the load is offset, either left or right, from the center position x0 of the x1-x2 axis of the platform (FIG. 2) and the y-axis offset is the distance the weight of the load is offset, either top or bottom, from the center position $Y_c$ of the $Y_2$-$Y_1$ axis of the platform (FIG. 2). The x-axis offset may be calculated by dividing either the sum of the partial weights W1 and W4 for the left side of the scale less the half weight, or the sum of the partial weights W2 and W3 for the right side of the scale less the half weight, by the half weight. The y-axis offset may be calculated by dividing either the sum of the partial weights W1 and W2 for the top side of the scale less the half weight, or the sum of the partial weight W4 and W3 for the bottom side of the scale less the half weight, by the half weight. Each of these calculations is carried by the processor 90 and the result stored in the memory 95.

Similarly, if for example, the y-axis offset was calculated using the top side partial weights, and the value of this y-axis offset is greater than zero (y-axis offset>0), then a disproportionate amount of weight is on the top side of the scale platform and the corresponding percentage value of the y-axis offset indicates the relative vector offset from the optimal position $y_c$. If the value of the y-axis offset is less than zero (y-axis offset<0), then a disproportionate amount of weight is on the bottom side of the scale platform and the corresponding percentage value of the y-axis offset indicates the relative vector offset from the optimal position $y_c$. If the value of the y offset is equal to zero (y-axis offset=0), then the weight on the top and bottom sides of the platform scale are equal and optimally positioned at $y_c$ of the $y_2$-$y_1$ axis.

In block 350, the processor communicates the values of x-axis and y-axis offsets (e.g. percentage values) to the display assembly 50 for display to the user, along with the determined weight. In this manner, the user obtains a visual indication of both the measured load weight as well as an indication of the load's relative position on the scale relative to the optimal position. In an alternative embodiment, the processor may activate some type of light and/or sound indicator when the load is located in or relocated to the optimal position instead of, or in addition to, communicating the x- and y-axis offsets to the display assembly 50. In such an embodiment, the determined weight may still be communicated to the display assembly 50 for display to the user.

Figure 5B:
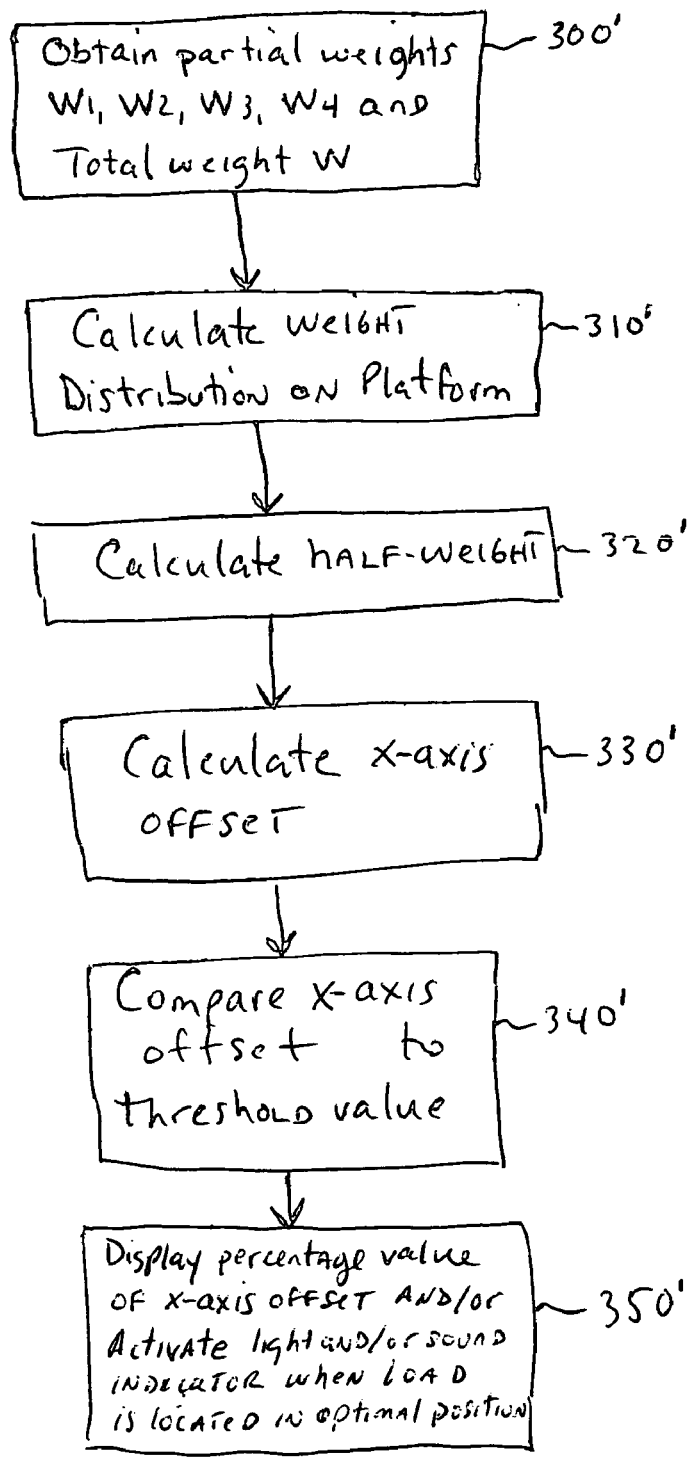
FIG. 5B is block diagram depicting another embodiment of a method for calculating the weight of the load, the actual position of the load on the platform, and how the actual position of the load on the platform deviates from the optimal position, according to the present invention.

In another embodiment, as shown in the block diagram of FIG. 5B, only the distance the weight of the load is offset, either left or right, from the center position $x_c$ of the $x_1$-$x_2$ axis of the platform is determined. Thus, the processor calculates only the x-axis load position in block 330', compares the x-axis offset with the predetermined threshold value to determine whether a disproportionate quantity of the load's weight is on the left or right sides of the scale platform in block 340' and communicates the result to the indicator and/or the display assembly in block 350'.

Figure 6:
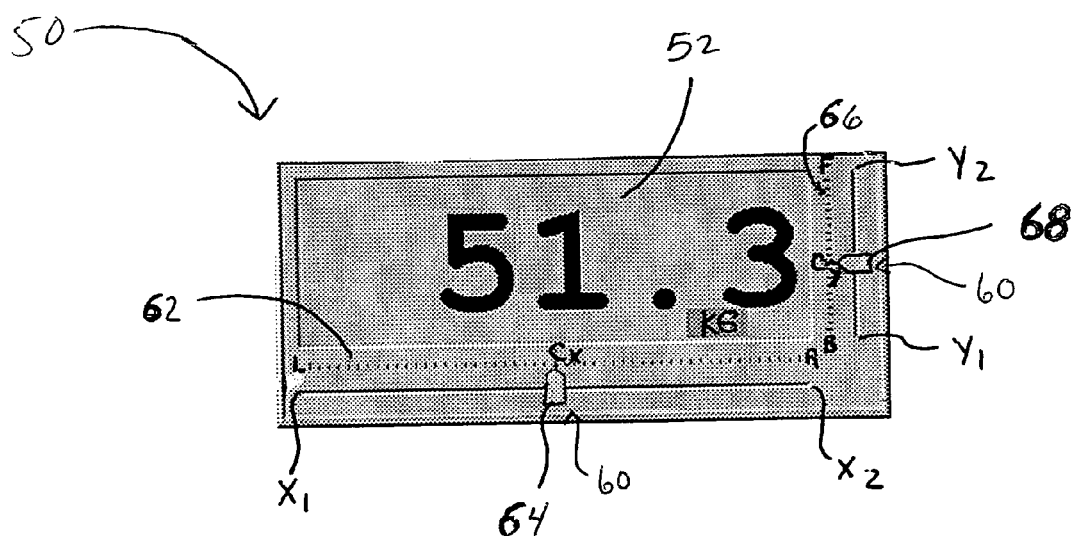
FIG. 6 is a plan view of an exemplary embodiment of a display assembly according to the present invention.

FIG. 6 shows an exemplary embodiment of the display assembly of the present invention. The display assembly 50 comprises a display window 52 for displaying a numerical indication of the total measured weight W of the load. The display assembly further comprises a meter or graphics position offset display 60 including a first scale 62 for indicating the load position along the $x_1$-$x_2$ (left-right) axis relative to an optimal center position $x_c$ (the percentage value of the x-axis offset) and a bi-directionally movable position indicator 64, and a second scale 66 for indicating the load position along the $y_2$-$y_1$ (front-back) axis relative to an optimal center position $y_c$ (the percentage value of the y-axis offset) and a bi-directionally movable position indicator 68. The first and second scales 62, 66 provide a graphical representation to the user of relative x and y offsets. In the embodiment where only the x-axis offset is utilized (FIG. 5B), the movable position indicator 64 would not be provided. Further, the meter or graphics position offset display 60 (with both x- and y-axis indicators or just x-axis indicator) may be omitted altogether and replaced with or combined with the visual and/or sound indicator mentioned earlier, which activates only if the load is in the optimal position. The visual indicator may be some type of a light generating device, such as an LED. The sound indicator may be a sound generating device that generates a ringing or buzzing sound. The visual and/or sound indicator may be separate from the display assembly or integrated therewith.

Figure 7A:
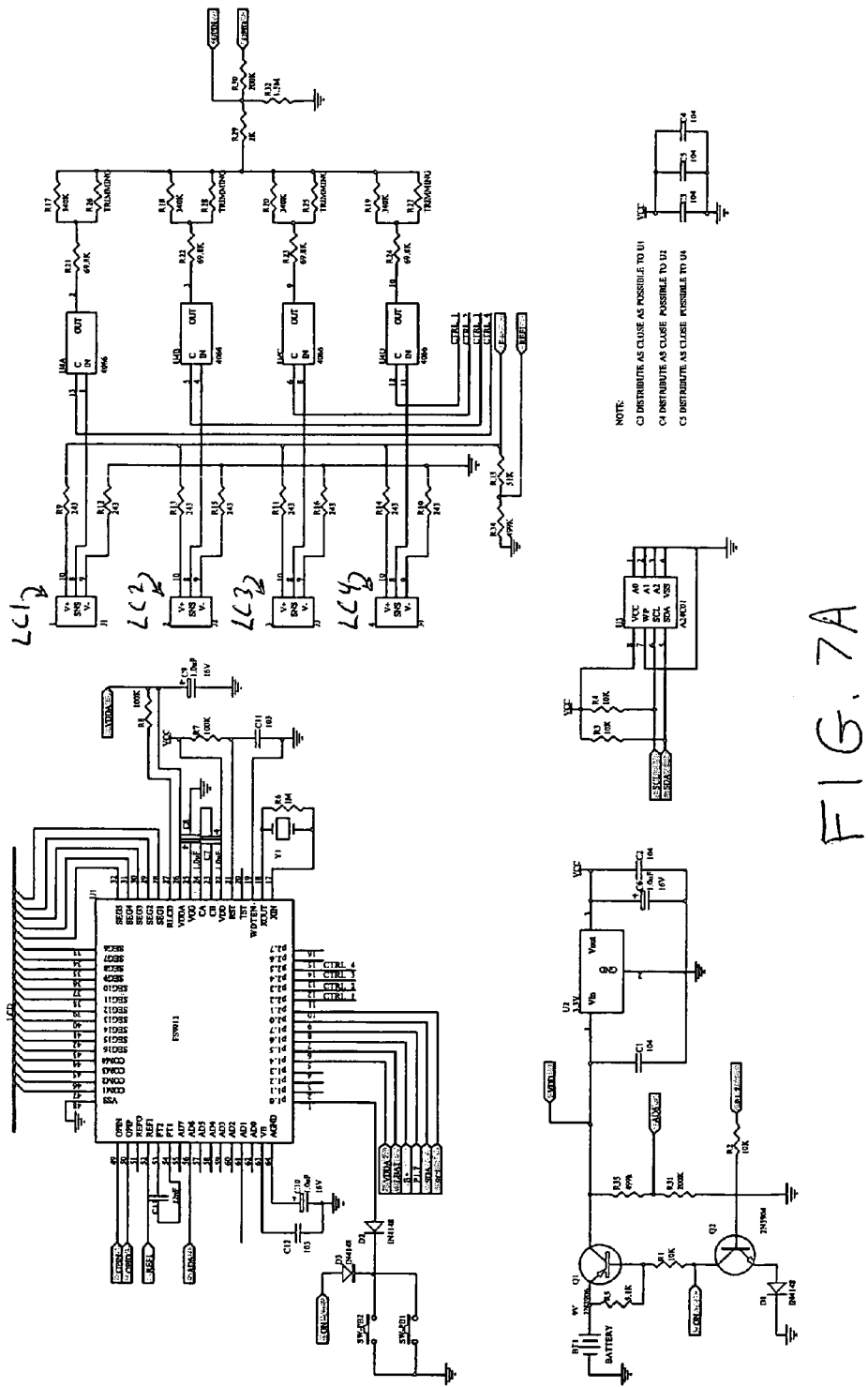
FIG. 7A is an exemplary embodiment of a circuit diagram of the processor and load cell circuitry of the weighing scale for implementing the embodiment of the method of FIG. 5A.
Figure 7B:
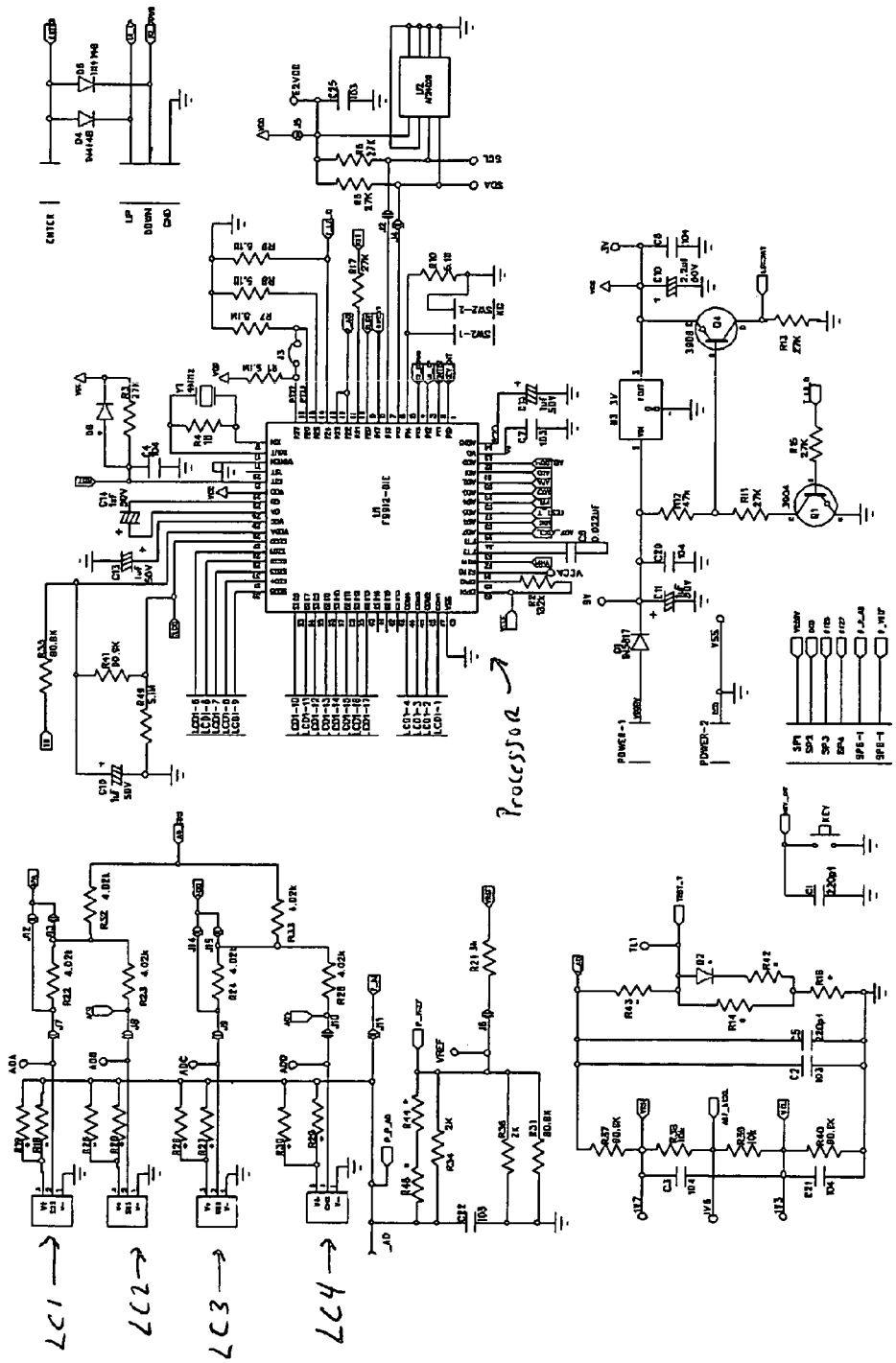
FIG. 7B an exemplary embodiment of a circuit diagram of the processor and load cell circuitry of the weighing scale for implementing the embodiment of the method of FIG. 5B.

FIG. 7A shows an exemplary embodiment of processor and load cell circuitry that is capable of calculating x- and y-axis offsets and comparing the x- and y-offsets to threshold values. FIG. 7B shows an exemplary embodiment of processor and load cell circuitry that is capable of calculating an x-axis offset and comparing the x-offset to a threshold value.

It is to be understood that one skilled in the art may make many variations and modifications to that described herein. All such variations are intended to be within the scope of the invention as defined in the appended claims.

What is claimed is:

1. A weighing scale comprising:
a platform for supporting a load to be weighed by the scale, the platform defining an optimal weighing position for optimally positioning the load thereon;
a plurality of load cells, each of the toad cells for sensing a portion of the load's weight and outputting an electrical signal indicative of the sensed portion of the load's weight;
a processor, operatively coupled to the load cells and summing each of the sensed weight portions to determine a total weight of the load, summing groupings of the sensed weight portions to determine an actual position of the load on the platform, and determining how the actual position of the load on the platform deviates from the optimal position dependently upon the sums of the groupings of the sensed weight portions; and
at least one of an indicator for indicating that the load is in the optimal position and a display for displaying the deviation of the actual position of the load from the optimal weighing position, so that the load can be repositioned to the optimal weighing position.

2. The scale according to claim 1, wherein the actual position is determined by calculating an x-axis load position offset using the sensed weight portions.

3. The scale according to claim 2, wherein the platform is divided into quadrants comprising a top left quadrant, a top right quadrant, a bottom left quadrant, and a bottom right quadrant, the x-axis offset being calculated by:
summing the sensed weight portions for one of a) an aggregate of the top left and bottom left quadrants and b) an aggregate of the top right and the bottom right quadrants, of the scale;
subtracting a half weight of the load from the sum; and
dividing the sum by the half weight of the load.

4. The scale according to claim 2, wherein the deviation of the actual position of the load from the optimal position is determined by comparing the x-axis offset to a predetermined threshold value to determine whether a disproportionate quantity of the load's weight is on one of a left side and a right side of the scale.

5. The scale according to claim 1, wherein the actual position is determined by calculating x-axis and y-axis load position offsets using the sensed weight portions.

6. The scale according to claim 5, wherein the platform is divided into quadrants comprising a top left quadrant, a top right quadrant, a bottom left quadrant, and a bottom right quadrant, the x-axis offset being calculated by:
  summing the sensed weight portions for one of a) an aggregate of the top left and bottom left quadrants and b) an aggregate of the top right and the bottom right quadrants, of the scale;
  subtracting a half weight of the load from the sum; and
  dividing the sum by the half weight of the load.

7. The scale according to claim 6, wherein the y-axis offset is calculated by:
  summing the sensed weight portions for one of a) an aggregate of the top left and top right quadrants and b) an aggregate of the bottom left and the bottom right quadrants, of the scale;
  subtracting a half weight of the load from the sum; and
  dividing the sum by the half weight of the load.

8. The scale according to claim 5, wherein the platform is divided into quadrants comprising a top left quadrant, a to right quadrant, a bottom left quadrant, and a bottom right quadrant, the y-axis offset calculated by:
  summing the sensed weight portions for one of a) an aggregate of the top left and top right quadrants and b) an aggregate of the bottom left and the bottom right quadrants, of the scale;
  subtracting a half weight of the load from the sum; and
  dividing the sum by a half weight of the load.

9. The scale according to claim 5, wherein the deviation of the actual position of the load from the optimal position is determined by comparing the x-axis and y-axis offsets to a predetermined threshold value to determine whether a disproportionate quantity of the load's weight is on one of a left side and right side of the scale and on a top and a bottom of the scale.

10. The scale according to claim 1, wherein each of the load cells is integrated into a support, the supports for supporting the platform on a surface.

11. The scale according to claim 1, wherein the indicator comprises at least one of a visual and a sound indicator.

12. The scale according to claim 11, wherein the scale includes both the indicator and the display.

13. The scale according to claim 12, wherein the indicator is part of the display.

14. A method for accurately positioning a load on a platform of a weighing scale, the method comprising the steps of:
  providing a plurality load cells, each of the load cells being positioned to sense a portion of the load's weight and output an electrical signal indicative of the sensed portion of the load's weight;
  summing groups of the outDuts to determine a total weight and a plurality of partial weights;
  determining an actual position of the load on the platform, and how the actual position of the load on the platform deviates from an optimal weighing position using the determined total weight and at least two of the partial weights; and
  indicating that the load is in the optimal position.

15. The method according to claim 14, further comprising the step of determining a total weight of the load.

16. The method according to claim 15, wherein the total weight determining step includes summing the sensed weight portions.

17. The method according to claim 14, wherein the actual position determining step includes calculating an x-axis load position offset using the sensed weight portions.

18. The method according to claim 17, further comprising the step of dividing the platform into quadrants comprising a top left quadrant, a top right quadrant, a bottom left quadrant, and a bottom right quadrant, wherein the x-axis offset is calculated by:
  summing the sensed weight portions for one of a) an aggregate of the top left and bottom left quadrants and b) an aggregate of the top right and the bottom right quadrants, of the scale;
  subtracting a half weight of the load from the sum; and
  dividing the sum by a half weight of the load.

19. The method according to claim 17, wherein the actual position determining step includes comparing the x-axis offset to a predetermined threshold value to determine whether a disproportionate quantity of the load's weight is on one of a left side and a right side of the scale.

20. The method according to claim 14, wherein the actual position determining step includes calculating x-axis and y-axis load position offsets using the sensed weight portions.

21. The method according to claim 20, further comprising the step of dividing the platform into quadrants comprising a top left quadrant, a top right quadrant, a bottom left quadrant, and a bottom right quadrant, wherein the x-axis offset is calculated by:
  summing the sensed weight portions for one of a) an aggregate of the top left and bottom left quadrants and b) an aggregate of the top right and the bottom right quadrants, of the scale;
  subtracting a half weight of the load from the sum; and
  dividing the sum by a half weight of the load.

22. The method according to claim 21, wherein the y-axis offset is calculated by:
  summing the sensed weight portions for one of a) an aggregate of the top left and top right quadrants and b) an aggregate of the bottom left and the bottom right quadrants, of the scale;
  subtracting a half weight of the load from the sum; and
  dividing the sum by a half weight of the load.

23. The method according to claim 20, further comprising the step of dividing the platform into quadrants comprising a top left quadrant, a top right quadrant, a bottom left quadrant, and a bottom right quadrant, wherein the y-axis offset is calculated by:
  summing the sensed weight portions of one of a) an aggregate of the top left and top right quadrants and b) an aggregate of the bottom left and the bottom right quadrants, of the scale;
  subtracting a half weight of the load from the sum; and
  dividing the sum by a half weight of the load.

24. The method according to claim 20, wherein the actual position determining step includes comparing the x-axis and y-axis offsets to a predetermined threshold value to determine whether a disproportionate quantity of the load's weight is on one of a left side and right side of the scale and on a top and a bottom of the scale.

25. The method according to claim 14, further comprising the steps of:
  displaying the deviation of the action position of the load from the optimal weighing position; and
  repositioning the load to the optimal weighing position.

26. A method for weighing a load comprising:
  providing a plurality load cells, each of the load cells being positioned to sense a portion of the load's weight and provide an electrical response indicative of the sensed portion of the load's weight;

determining partial weights corresponding to groupings of the load cells;

determining a deviation between the actual position of the load on the platform and an optimal weighing position using the determined partial weights;

providing an indication indicative of the determined deviation;

determining whether a time-out has occurred; and where a time-out is determined to have occurred, providing an indication of total sensed weight regardless of the deviation.

* * * * *